United States Patent
Okubo et al.

(10) Patent No.: US 7,095,778 B2
(45) Date of Patent: *Aug. 22, 2006

(54) SPREAD SPECTRUM TRANSMITTER AND SPREAD SPECTRUM RECEIVER

(75) Inventors: Seiji Okubo, Tokyo (JP); Tatsuya Uchiki, Tokyo (JP); Toshiharu Kojima, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 597 days.

This patent is subject to a terminal disclaimer.

(21) Appl. No.: 10/334,947

(22) Filed: Jan. 2, 2003

(65) Prior Publication Data

US 2003/0138031 A1 Jul. 24, 2003

(30) Foreign Application Priority Data

Jan. 18, 2002 (JP) .................................. 2002-009664

(51) Int. Cl.
 *H04B 1/707* (2006.01)

(52) U.S. Cl. ...................... 375/130; 375/146; 375/147; 375/279

(58) Field of Classification Search ................ 375/130, 375/146, 147, 140, 295, 316, 341, 308, 329, 375/279

See application file for complete search history.

(56) References Cited

U.S. PATENT DOCUMENTS

| 5,103,459 | A | | 4/1992 | Gilhousen et al. |
| 5,579,338 | A | | 11/1996 | Kojima |
| 6,041,074 | A | * | 3/2000 | Nakamura .................. 375/142 |
| 6,205,169 | B1 | * | 3/2001 | Nakamura .................. 375/152 |
| 6,728,298 | B1 | * | 4/2004 | Okubo et al. ............... 375/146 |
| 2002/0009125 | A1 | * | 1/2002 | Shi ............................ 375/139 |

FOREIGN PATENT DOCUMENTS

JP          2672769 B2          7/1997

* cited by examiner

*Primary Examiner*—Temesghen Ghebretinsae
(74) *Attorney, Agent, or Firm*—Birch Stewart Kolasch & Birch LLP

(57) ABSTRACT

A spread spectrum transmitter provides delays having different magnitudes to spread spectrum (SS) signals for a plurality of channels, and multiplexes the SS signals to generate transmission multiplex SS signal. A spread spectrum receiver calculates a partial correlation value between the transmission multiplex SS signal and spreading codes multiplied to the SS signals, multiplies the partial correlation values by a prescribed matrix prepared based on each orthogonal code sequence to calculate a plurality of orthogonal correlation values. The receiver identifies for a respective channel each parallel data sequence related in advance to an orthogonal code sequence whose orthogonal correlation value is a maximum, corrects delay differences of the parallel data sequences, and then performs sampling and parallel-serial conversion to obtain a serial demodulated data sequence.

10 Claims, 12 Drawing Sheets

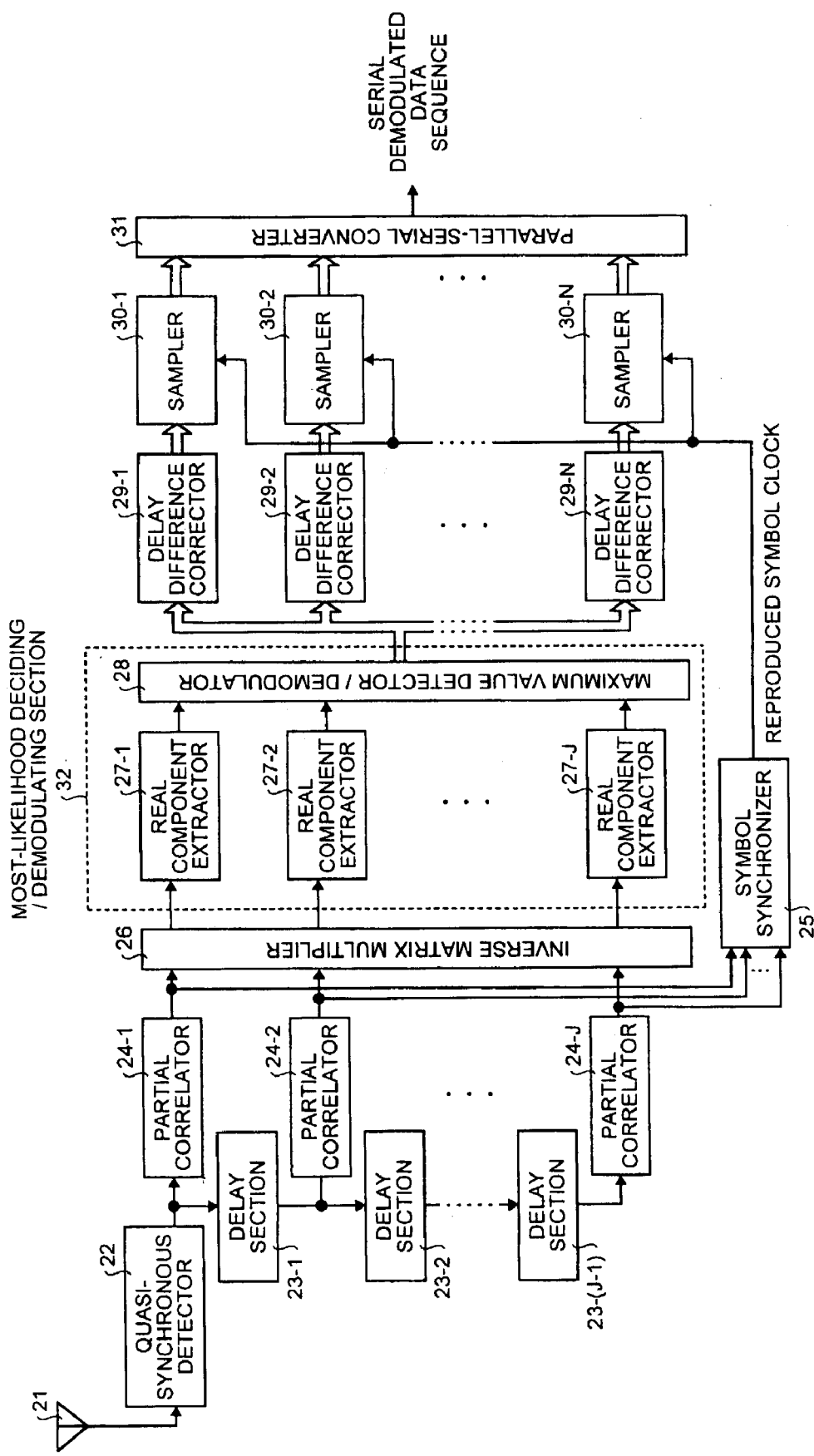

($\alpha_1=0$, $\alpha_2=\pi/4$, $\alpha_3=\pi/2$, $\alpha_3=3\pi/4$)

$T_S$: ONE-CYCLIC PERIOD OF PN CODES AND WALSH FUNCTION
$T_C$: CHIP PERIOD

SPREAD SPECTRUM TRANSMITTER AND SPREAD SPECTRUM RECEIVER

BACKGROUND OF THE INVENTION

1) Field of the Invention

The present invention relates to an improvement to a transmitter and a receiver of a spread spectrum radio communications system. More particularly, this invention relates to an increased transmission rate of a spread spectrum transmitter and a spread spectrum receiver employing an M-ary/SS system.

2) Description of the Related Art

In recent years, attention has been focused on spread spectrum (hereinafter referred to as "SS") systems as a transmission system of information signals such as image signals and audio signals, in the field of mobile communications system.

Among such SS systems, an "M-ary/SS system" is adaptive for increasing the transmission rate and has been used widely. In the M-ary/SS system, mutually orthogonal $2^K$ code sequences (hereinafter referred to as "orthogonal code sequences") are stored in advance in both a transmitter and a receiver. The transmitter sequentially generates data sequences in unit of K bits (K≧2) from an information signal. The data sequences are respectively replaced by prescribed orthogonal code sequences related thereto in advance, and the orthogonal code sequences are multiplied by prescribed pseudo-noise (PN) codes, so that signal spectrum is directly spread for radio transmission. The M-ary/SS system can transmit a single orthogonal code sequence corresponding to an information signal of K bits, by one period of PN code as a minimum unit in spread spectrum modulation process.

FIG. 11 shows in block diagram a transmitter of a conventional M-ary/SS system disclosed in U.S. Pat. No. 5,103,459. The operation of the transmitter of the conventional M-ary/SS system will be explained below with reference to FIG. 11.

First, a data generator 1 generates an information signal to be transmitted. The data generation rate of the information signal will be referred to as "bit rate" $R_b$ (bits/sec).

A serial-parallel converter 91 sequentially converts the information signal into parallel data sequences of an information length of K bits, where K is 2 or greater natural number. The number of parallel data sequences generated per unit time will be referred to as "symbol rate" $R_s$ ($=R_b/K$), and the generation period of parallel data sequences will be referred to as "symbol period" $T_s$ ($=1/R$, unit: sec).

A Walsh function converter 92 receives parallel data sequences, and generates, from among a total number of $2^K$ orthogonal code sequences predetermined for an entirety of an associated spread spectrum communications system (Walsh sequence defined by Walsh function and a respective orthogonal code sequence has a sequence length of $2^K$ bits), those orthogonal code sequences related in advance to the parallel data sequences, and output the generated orthogonal code sequences. The generation rate of the orthogonal code sequences is identical to the symbol period $T_s$ of the parallel data sequences.

A PN code generator 6 generates PN codes with a code cyclic period of L chips, a chip generation rate $R_c (=L \times R_s$, unit: chips/sec, hereinafter called "chip rate"), and a chip generation period $T_c$ ($=1/R_c$, unit: sec, hereinafter called "chip period"). It is assumed herein that the cyclic period L chip of the PN codes is an integral multiple of the sequence length ($2^K$ bits) of the orthogonal code sequences, and that a specific PN code is allotted in advance in each transmitter.

Next, a spreading modulator 93 multiplies the orthogonal code sequences by PN codes to generate SS signals.

FIG. 12 shows in time chart generation timings of the SS signals. In FIG. 12, the sequence length $2^K$ of orthogonal code sequences=4 bits (K=2), and the cyclic period L of PN codes=8 chips (the number of chips of PN codes per one bit of orthogonal code sequence $L/2^K=2$).

A frequency converter 9 performs a frequency conversion process by multiplication of the SS signals and a carrier of a prescribed frequency, and a power amplifier 10 performs power amplification of the SS signals after the frequency conversion process to generate a radio signal. A transmission antenna 11 transmits the radio signal.

As explained above, the transmitter of conventional M-ary/SS system spreads spectra of an information signal to be transmitted by using a total number of $2^K$ orthogonal code sequences predetermined for the entire spread spectrum communications system and spreading codes (PN codes) specific to respective transmitters.

The conventional M-ary/SS system has a transmission rate $t_r$ (bits/sec) defined by the following equation 1.

$$t_r = \frac{K}{L} R_c \qquad (1)$$

In the convention M-ary/SS system, however, as one PN code is allotted to one transmitter, the transmission rate of transmitters is restricted to the transmission rate $t_r$ defined by the equation 1.

By allotting a plurality of PN codes to one transmitter to perform a plurality of radio communications in parallel using the PN codes, the transmission rate can be increased. However, this results in an increase in scale of circuitry of associated transmitter and receiver.

For a limitation to the number of PN codes concurrently employable within an entire spread spectrum communications system, the allotment of a plurality of PN codes to a single transmitter results in running out of employable PN codes.

SUMMARY OF THE INVENTION

It is an object of the invention to provide a spread spectrum transmitter and a spread spectrum receiver capable of performing communications with a higher transmission rate than the conventional transmitter, even when one PN code is allotted to one transmitter, while an increase in the scale of circuitry of transmitter and receiver of the conventional M-ary/SS system can be minimized.

Another object of the invention is to provide a spread spectrum transmitter and a spread spectrum receiver capable of obtaining favorable demodulation characteristics even with an increased transmission rate $t_r$.

The spread spectrum transmitter according to one aspect of this invention, comprises a serial-parallel converting unit that inputs an information signal, sequentially converts the information signal into parallel data sequences of a prescribed data length, and sequentially distributes the parallel data sequences to N channels, where N is 2 or greater natural number. The transmitter also comprises an orthogonal sequence encoding unit that sequentially converts the parallel data sequences into prescribed orthogonal code sequences, a spreading modulating unit that performs a spectrum spreading modulation process by respectively multiplying the orthogonal code sequences by prescribed spreading codes to output N spread spectrum signals, and a delay unit that provides delays having different magnitudes to the N spread spectrum signals. The transmitter further comprises a multiplexing unit that multiplexes the N spread spectrum signals in a prescribed manner to generate a transmission multiplex spread spectrum signal, and a transmitting unit that performs prescribed signal processing for transmitting the transmission multiplex spread spectrum signal.

The spread spectrum receiver according to another aspect of this invention, comprises a partial correlation calculating unit that holds partial spreading codes obtained by dividing spreading codes employed in a spread spectrum transmitter by a bit number J of orthogonal code sequences, and calculates partial correlation values between a transmission multiplex spread spectrum signal transmitted from the spread spectrum transmitter and the partial spreading codes. The spread spectrum transmitter includes the same components as those explained above. The receiver also comprises an inverse matrix multiplying unit that holds an inverse matrix of an orthogonal code matrix having the orthogonal code sequences employed in the spread spectrum transmitter as row elements of the orthogonal code sequences, and multiplies the inverse matrix by a column vector consisting of the partial correlation values to calculate orthogonal correlation values respectively corresponding to the orthogonal code sequences. The receiver further comprises a most-likelihood deciding/demodulating unit that identifies an orthogonal code sequence having an orthogonal correlation value as a maximum to output a parallel data sequence related in advance to the orthogonal code sequence, as a demodulated parallel data sequence to a respective one of N channels, and a delay difference correcting unit that corrects delay differences of the demodulated parallel data sequences of the channels depending on delay amounts provided to the spread spectrum signals in the channels of the spread spectrum transmitter. The receiver further comprises a demodulation data converting unit that samples the demodulated parallel data sequences after delay difference correction depending on a reproduced symbol clock synchronized to a cyclic period of spreading code of the transmission multiplex spread spectrum signal, and parallel-serial converts the sampled data of the channels to obtain a serial demodulated data sequence.

These and other objects, features and advantages of the present invention are specifically set forth in or will become apparent from the following detailed descriptions of the invention when read in conjunction with the accompanying drawings.

BRIEF DESCRIPTION OF THE DRAWINGS

FIG. 3 is a block diagram of a spread spectrum receiver in the first embodiment.

DETAILED DESCRIPTIONS

Embodiments of this invention will be explained with reference to the accompanying drawings.

A first embodiment of this invention will be explained below.

Figure 1:
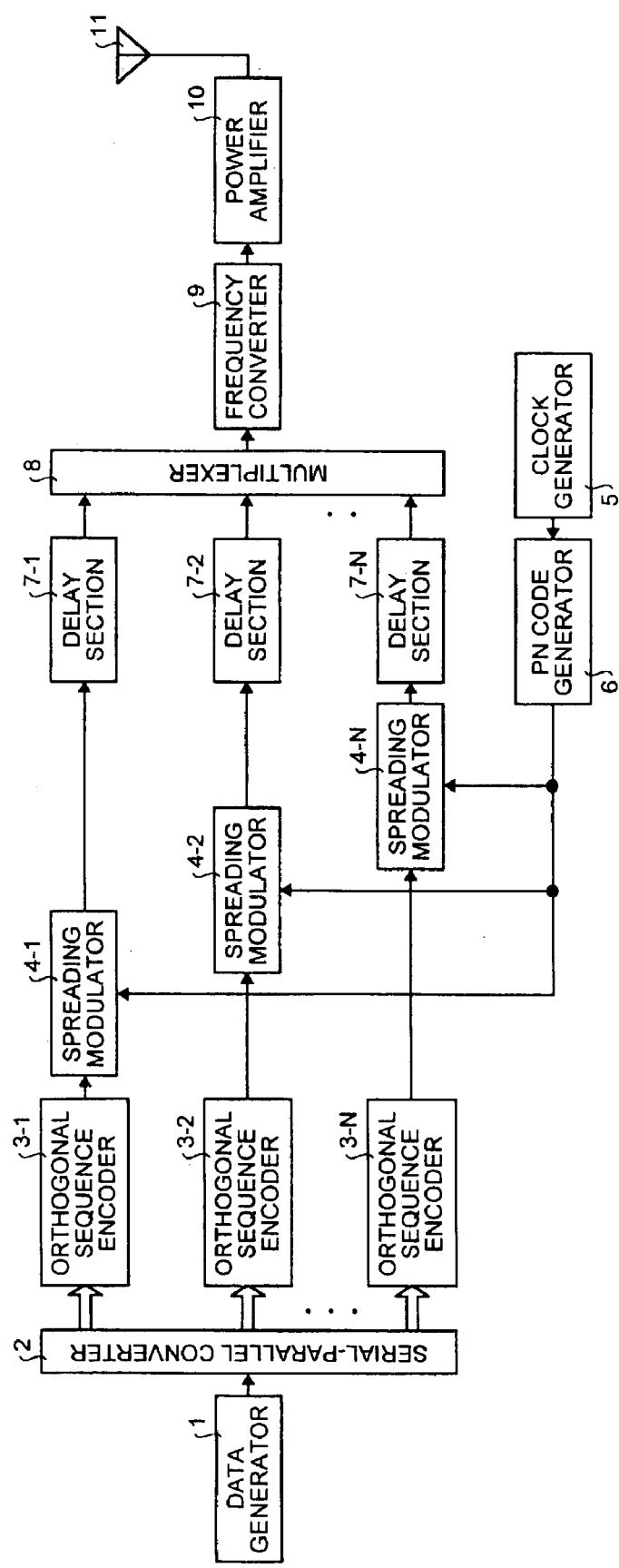
FIG. 1 is a block diagram of a spread spectrum transmitter in a first embodiment of the invention.

FIG. 1 is a block diagram of the spread spectrum transmitter in the first embodiment. As shown in FIG. 1, the spread spectrum transmitter is provided with a data generator 1 that generates an information signal, a serial-parallel converter 2 that converts the information signal into N prescribed parallel data sequences, orthogonal sequence encoders 3-1 to 3-N that convert N parallel data sequences into prescribed N orthogonal code sequences, respectively, and spreading modulators 4-1 to 4-N that perform spreading processes on the N orthogonal code sequences to generate SS signals, a clock generator 5. The spread spectrum transmitter is also provided with a PN code generator 6 that generates a prescribed PN code, N delay sections 7-1 to 7-N that provides prescribed delays to the SS signals, respectively, a multiplexer 8 that multiplexes the SS signals provided with the delays to generate a multiplex SS signal, a frequency converter 9 that performs a frequency conversion process on the SS signal, a power amplifier 10, and a transmission antenna 11 (transmitting unit).

The operation of the spread spectrum transmitter according to the first embodiment configured as described above will be explained below.

First, the data generator 1 outputs an information signal to be transmitted, at a bit rate of $R_b{}'$ bits/sec, letting each information bit be +1/−1.

Next, the serial-parallel converter 2 sequentially converts the information signal into parallel K-bit data sequences, and sequentially distributes the parallel data sequences to the N orthogonal sequence encoders 3-1 to 3-N.

A bit length K of each parallel data sequence corresponds to a number of bits of the information signal transmittable by a single orthogonal code sequence. The numerical N is a preset desirable integer to be a number of SS signal channels available at a single spread spectrum transmitter.

In the first embodiment, a symbol rate $R_s$ represents the output rate ($=R_b{}'/(K \times N)$) of parallel data sequences from the serial-parallel converter 2 to all the orthogonal sequence encoders 3-1 to 3-N (symbol period $T_s=1/R_s$).

The orthogonal sequence encoders 3-1 to 3-N store orthogonal code sequences $d_1$ to $d_j$ ($2^K$ bits each in sequence length) prescribed for the whole of the spread spectrum communications system. The orthogonal code sequences $d_1$ to $d_j$ are correlated to combinations (a total combination of $2^K{}_j$) of the parallel data sequences in advance, respectively, where a relation of $J=2^K$ holds.

For example, when each parallel data sequence has a bit length K=2 ($J=2^K=4$), their orthogonal code sequences $d_1$ to $d_4$ are given such that $d_1=(1, 1, 1, 1)$, $d_2=(1, -1, 1, -1)$, $d_3=(1, 1, -1, -1)$, and $d_4=(1, -1, -1, 1)$, and they have 4 combinations in total, such that $c_1$: <0, 0>, $c_2$ : <0, 1>, c3: <1, 0>, and $c_4$: <1, 1>.

The orthogonal code sequences $d_1$ to $d_4$ and the combinations $c_1$ to $c_4$ of parallel data sequences have predetermined correspondences therebetween such that orthogonal code sequence $d_1$ corresponds to $c_1$, $d_2$ corresponds to $c_2$, $d_3$ corresponds to $c_3$, and $d_4$ corresponds to $c_4$.

The combinations $c_1$ to $c_j$ of parallel data sequences and the orthogonal code sequences $d_1$ to $d_j$ have correspondences predetermined therebetween in design stage of the spread spectrum communications system and applied commonly to the respective spread spectrum transmitters, as well as to respective associated spread spectrum receivers.

The orthogonal sequence encoders 3-1 to 3-N are configured to convert input parallel data sequences into corresponding orthogonal code sequences to be output. At each orthogonal sequence encoder 3-1 to 3-N, the generation rate of the orthogonal code sequence is identical to the symbol period $T_s$ of the parallel data sequences.

On the other hand, the PN code generator 6 receives a local oscillation signal output from the clock generator 5 to generate, as a spreading code, a PN code (+1/−1 for each chip) with a code cyclic period of L chips, a chip rate $R_c$ (=L×$R_s$ chips/sec), and a chip period $T_c$(=1/$R_c$ sec), assuming that the PN code cyclic period of L chips is an integral multiple of the sequence length ($2^K$ bits) of the orthogonal code sequences $d_1$ to $d_j$, and that a specific PN code is allotted in advance to a respective transmitter.

Figure 12:
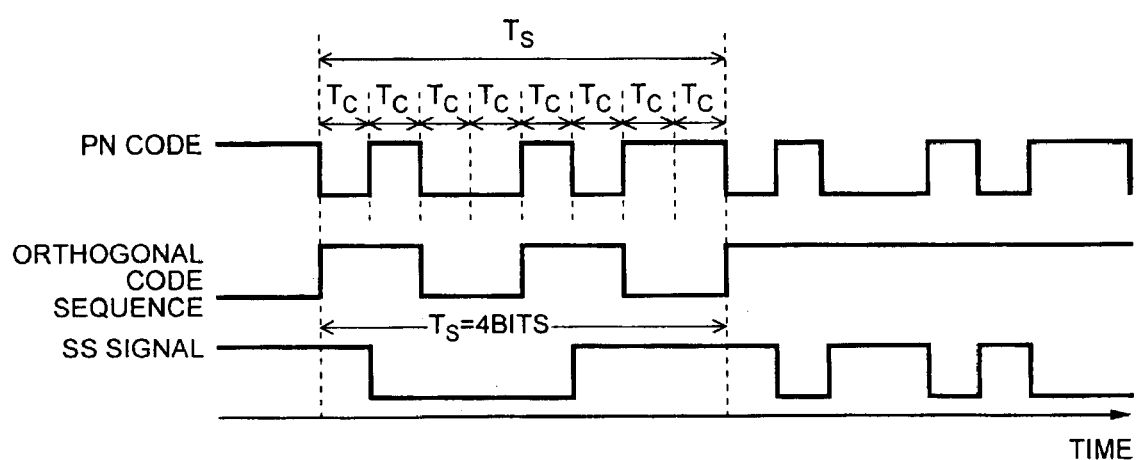
FIG. 12 shows a timing chart of SS signals according to the invention.

The spreading modulators 4-1 to 4-N multiplies an orthogonal code sequence output from each of corresponding orthogonal sequence encoders 3-1 to 3-N by the PN code as a spreading code, to generate an SS signal, like the case shown in FIG. 12.

It is noted that the spreading modulators 4-1 to 4-N employ an identical PN code output from the PN code generator 6.

The delay sections 7-1 to 7-N have delay times $ô_1T_c$ to $ô_NT_c$ preset thereto in terms of the chip period $T_c$ of PN code, where ôhd 1to $ô_N$ (hereinafter each referred to as "delay factor") are integers meeting a relationship, such that $0 \leq ô_1 < ô_2 < ô_3 < \ldots < ô_N < L$, in which adequate values are preset upon start of communication or design of the spread spectrum transmitter.

The delay sections 7-1 to 7-N are each respectively configured to provide an associated one of the preset delay times $ô_1T_c$ to $ô_NT_c$ to a corresponding SS signal to provide the SS signal with an offset of time different from any SS signal else.

Next, the multiplexer 8 sums the total number N of delayed SS signals to generate a multiplex SS signal to be transmitted ("transmission multiplex SS signal").

Figure 2A:
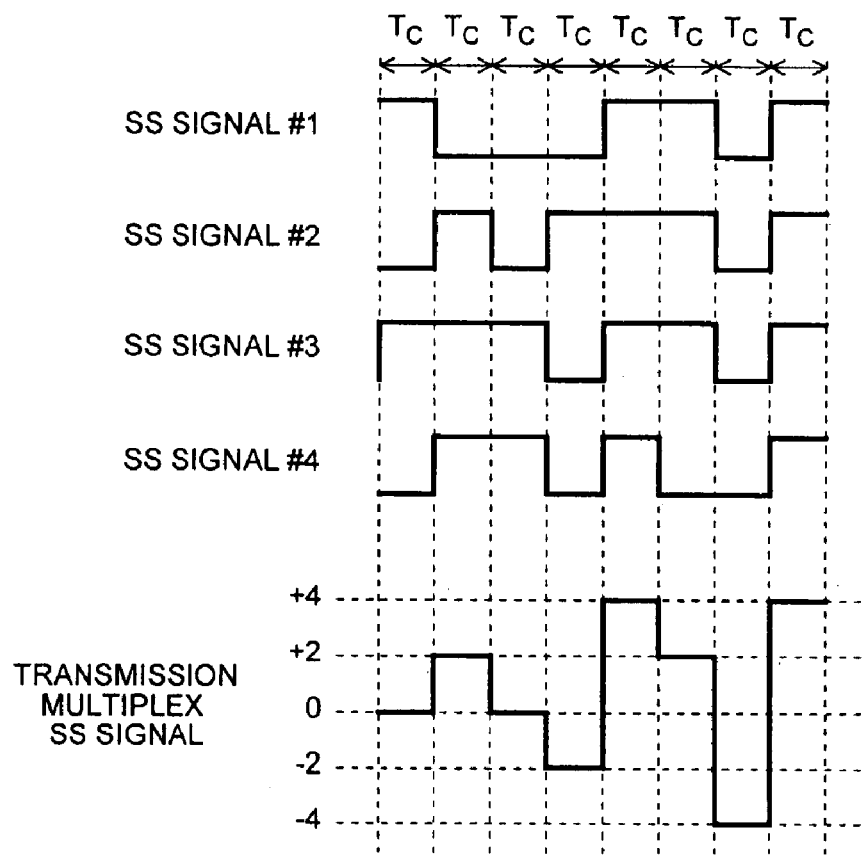
FIG. 2A and FIG. 2B show how to generate a multiplex SS signal to be transmitted in the first embodiment.

FIG. 2A shows how to generate a transmission multiplex SS signal for the case of N=4. Four SS signals (#1 to #4) are provided to thereby generate a transmission multiplex SS signal whose value varies each chip period $T_c$. In the case of N=4, the SS signal takes any value of {−4, −2, 0, +2, +4}.

Figure 2B:
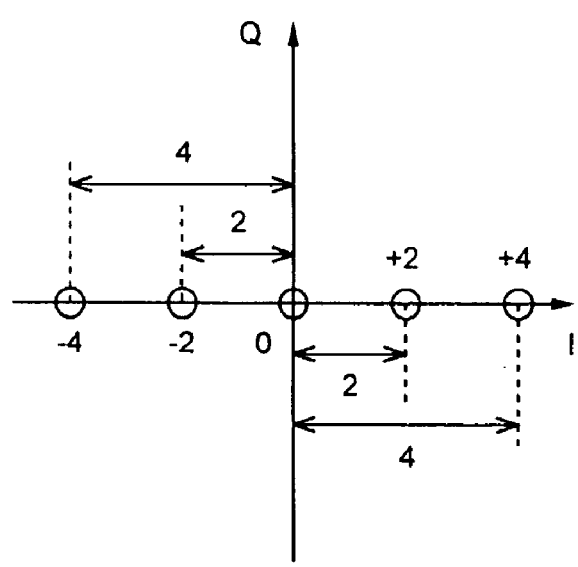

The frequency converter 9 multiplies the transmission SS signal by a carrier of a prescribed frequency to perform a frequency conversion process. FIG. 2B is a schematic diagram showing an example of where signal points of the transmission SS signal are located after the frequency conversion. In the example shown in FIG. 2B, respective values {−4, −2, 0, +2, +4) of the transmission SS signal are located at signal points on an in-phase axis (I axis).

The transmission SS signal after frequency conversion undergoes a process at the power amplifier 10 where the signal is amplified in power to a prescribed value, to be transmitted from the transmission antenna 11.

A spread spectrum receiver of the spread spectrum communications system according to the first embodiment will be explained below with reference to FIG. 3. In FIG. 3, the spread spectrum receiver is provided with a reception antenna 21 which receives a transmission multiplex SS signal of carrier frequency transmitted from the spread spectrum transmitter, a quasi-synchronous detector 22 for a process of frequency-converting the transmission multiplex SS signal, and delay sections 23-1 to 23-(J-1) each for providing a prescribed corresponding delay to the transmission multiplex SS signal respectively after the frequency conversion process, and partial correlators 24-1 to 24-J each for calculating a correlation value between a received signal after being provided with the corresponding delay and the PN code allotted to the spread spectrum transmitter, respectively. The spread spectrum receiver is also provided with an inverse matrix multiplier 26 that calculates an orthogonal correlation complex signal for a respective one of the orthogonal code sequences $d_1$ to $d_j$ based on the correlation value, and a most-likelihood deciding/demodulating section 32 that determines a particular demodulated parallel data sequence based on the orthogonal correlation complex signal. The most-likelihood deciding/demodulating section 32 has real component extractors 27-1 to 27-J, and a maximum value detector/demodulator 28.

The spread spectrum receiver is further provided with a symbol synchronizer 25 which generates a reproduced symbol clock, delay difference correctors 29-1 to 29-N which correct delay differences between the parallel data sequences, samplers 30-1 to 30-N which sample demodulated data sequences based on the respective reproduced symbol clock, and a parallel-serial converter 31 (demodulation data converting unit) for a parallel-serial conversion of the demodulated data sequences output from the samplers 30-1 to 30-N to generate a serial demodulated data sequence.

It is noted that each total number J of the partial correlators 24-1 to 24-J and the real component extractors 27-1 to 27-J is identical to the total number (J=$2^K$) of the orthogonal code sequences employed in the spread spectrum receiver.

The operation of the spread spectrum receiver according to the first embodiment configured as described will be explained below. First, the quasi-synchronous detector 22 performs a quasi-synchronous detection on the transmission multiplex SS signal of a prescribed carrier frequency input from the reception antenna 21 to convert the frequency to a prescribed frequency.

The delay sections 23-1 to 23-(J-1) provide only a corresponding amount of delay (L/J) obtained by equally dividing the cyclic period of L chip time of the PN code by the total number J of the orthogonal code sequences, to output the result. Accordingly, the delay section 23-1 outputs a complex base band signal with a delay of L/J, and the delay section 23-(J-1) outputs a complex base band signal with a delay of (J-1) L/J.

A j-th partial correlator 24-j, where j is a variant for identification of a partial correlator, such that $j^a${1, 2, . . . , J), stores a j-th partial spreading code of J fractions into which the spreading code (PN code) employed in the spread spectrum transmitter is divided.

The partial correlator 24-j is adapted for calculation of a correlation value between the corresponding partial spreading code and a complex base band signal with a prescribed corresponding amount of delay provided, to be output as a corresponding partial correlation complex signal $e_j$.

The inverse matrix multiplier 26 stores, in a prescribed matrix form, a total number J of the orthogonal code sequences $d_1$ to $d_J$ applied to the spread spectrum communications system and employed for a decoding process of orthogonal sequences at the orthogonal sequence encoders 3-1 to 3-N in the spread spectrum transmitter.

More specifically, the inverse matrix multiplier 26 stores in advance an inverse matrix D (J rows by J columns) of an orthogonal code matrix having the orthogonal code sequences $d_1$ to $d_j$ as row elements, as shown by the following equation 2.

$$D = \begin{pmatrix} d_1 \\ d_2 \\ \vdots \\ d_j \end{pmatrix}^{-1} \quad (2)$$

The inverse matrix multiplier 26 is adapted for a multiplication process between the partial correlation complex signals $e_j$ and the inverse matrix D according to the following equation 3, to calculate a matrix of orthogonal correlation complex signals $i_1$ to $i_j$ relative to the orthogonal code sequences $d_i$ to $d_j$.

$$\begin{pmatrix} i_1 \\ i_2 \\ \vdots \\ i_j \end{pmatrix} = D \begin{pmatrix} e_1 \\ e_2 \\ \vdots \\ e_j \end{pmatrix} \quad (3)$$

As the N time-offset SS signals are multiplexed at the multiplexer 8 of spread spectrum transmitter, the J orthogonal correlation complex signals $i_i$ to $i_j$ have a peak value occurring a total number of N times during the symbol period $T_s$.

Next, at the most-likelihood deciding/demodulating section 32, each of the real component extractor 27-1 to 27-J extracts and outputs simply a real component from the corresponding orthogonal complex signals $i_1$ to $i_j$.

The maximum value detector/demodulator 28 extracts a maximum value among the real components of the J orthogonal complex signals $i_1$ to $i_j$, to thereby identify a demodulated parallel data sequence corresponding thereto.

For example, if the maximum value is a real part of the orthogonal correlation complex signal $i_1$ relating to the orthogonal code sequence $d_1$, a parallel data sequence $c_1$: <0, 0> correlated to the orthogonal code sequence $d_1$ is identified as the demodulated parallel data sequence.

On the other hand, the symbol synchronizer 25 detects a code synchronism with the PN signal as the spreading signal employed in the spread spectrum transmitter based on the partial correlation complex signals output from the partial correlators 24-1 to 24-J, and generates a reproduced symbol clock in synchronism with a cyclic period (L chip time) of the PN code.

Figure 4:
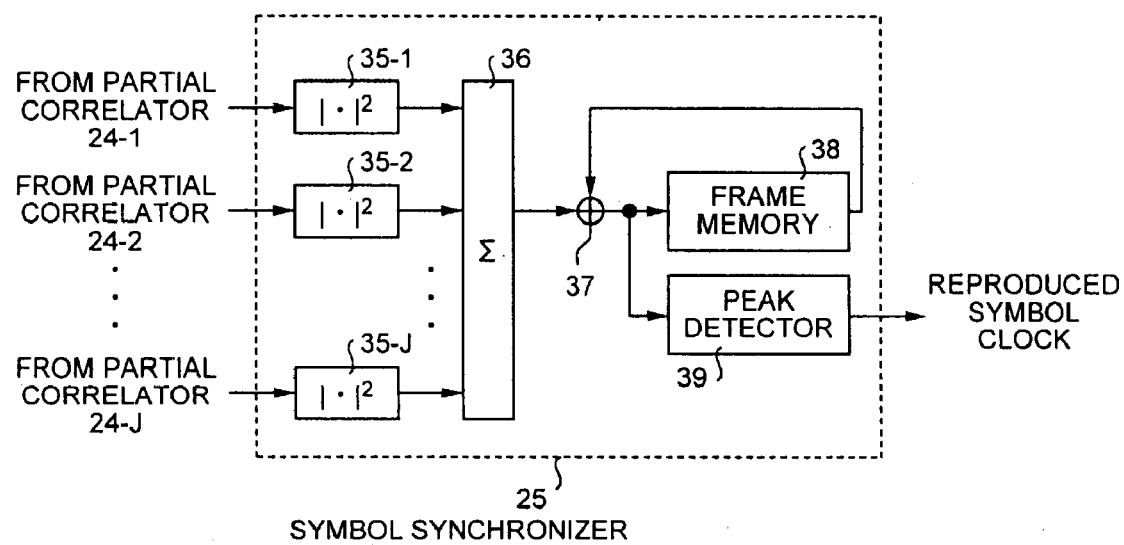
FIG. 4 is a block diagram of a symbol synchronizer in the first embodiment.

FIG. 4 shows an SS-oriented symbol synchronizer employing partial correlators, as disclosed in Japanese Patent No. 2672769. As shown in FIG. 4, the symbol synchronizer includes square calculators 35-1 to 35-J, a first adder 36 which calculates a sum of output signals of the square calculators 35-1 to 35-J, a second adder 37 for an addition of a stored signal in a frame memory 38 to an output signal of the first adder 36, and a peak detector 39.

The operation of the symbol synchronizer 25 will be explained below. Each of the square calculators 35-1 to 35-J calculates an absolute value of a square of a partial complex correlation signal output from the corresponding partial correlators 24-1 to 24-J. The first adder 36 calculates a correlation power signal as a sum of absolute values of squares of partial correlation signals output from the partial correlators 24-1 to 24-J.

The second adder 37 cooperates with the frame memory 38 to perform a cumulative addition (cyclic addition) of the correlation power signal at intervals of cyclic period (L chip time) of the PN code. The peak detector 39 generates a reproduced symbol clock in synchronism with a timing at which the result of cyclic addition becomes a maximum within the cyclic period of the PN code.

A corresponding one of the delay times $ô_1 T_c$ to $ô_N T_c$ provided at the delay sections 7-1 to 7-N in the spread spectrum transmitter is preset in each of the delay difference corrector 29-1 to 29-N. The delay difference correctors 29-1 to 29-N provide different delays $ô_1 T_c$ to $ô_N T_c$ to a total number N of demodulated parallel data sequences output from the most-likelihood deciding/demodulating section 32.

As the J orthogonal correlation complex signals $i_1$ to $i_j$ have a peak value occurring N times during the symbol period $T_s$, the provision of delays $ô_1 T_c$ to $ô_N T_c$ to N demodulated parallel data sequences makes the symbol timing mutually match among the total number N of the multiplexed demodulated data sequences.

Each of the samplers 30-1 to 30-N samples a demodulated data sequence of K bits per one symbol in accordance with the reproduced symbol clock. The parallel-serial converter 31 performs a parallel-serial conversion of the N demodulated data sequences to obtain a serial demodulated data sequence of bit rate $R_b'$.

According to the first embodiment, as a combination of the spread spectrum transmitter and the spread spectrum receiver described, the spread spectrum communications system is implemented to achieve a transmission rate $t_4'$ as indicated by the following equation 4.

$$t_r' = N \times \frac{K}{L} R_c \quad (4)$$

Therefore, the spread spectrum communications system according to the first embodiment allows the transmission rate to be an increased transmission rate $t_r$ as high as N times of the transmission rate $t_r$ (equation 1) of the conventional M-ary SS system.

Moreover, according to the first embodiment, one PN code is allotted to one spread spectrum transmitter, and different delays are provided to a plurality of parallel data sequences to be multiplexed for transmission, thus eliminating the need of allotting a plurality of PN codes to one spread spectrum transmitter for multiplex transmission of a plurality of parallel data sequences, making effective use of PN codes limited in number of combinations.

In the spread spectrum receiver of the first embodiment, none of orthogonal code sequences $d_1$ to $d_j$ is particularly specified for selection. However, by apply Walsh sequences defined by a Walsh function, as the orthogonal code sequences $d_1$ to $d_j$, it is possible to apply a high-speed Hadamard transformation to matrix operation at the inverse matrix multiplier 26, with a possible reduction in scale of circuitry in the spread spectrum receiver.

Moreover, in the first embodiment, the PN code has a cyclic period of L chips set to be an integral multiple of a sequence length ($2^K$ bits) of the orthogonal code sequences $d_1$ to $d_J$, for the description to be simplified and comprehensive. However, the PN code cyclic period L is not always limited in such a manner. For example, the number of chips of the PN code allotted to each bit of the orthogonal code sequence may preferably be uneven to adjust, according to the number of chips in each bit of the PN code, the delay amount to be provided at each delay section 23-1 to 23-(J-1) and the interval for calculating a correlation value at each of the partial correlators 24-1 to 24-J in the spread spectrum receiver.

Figure 5:
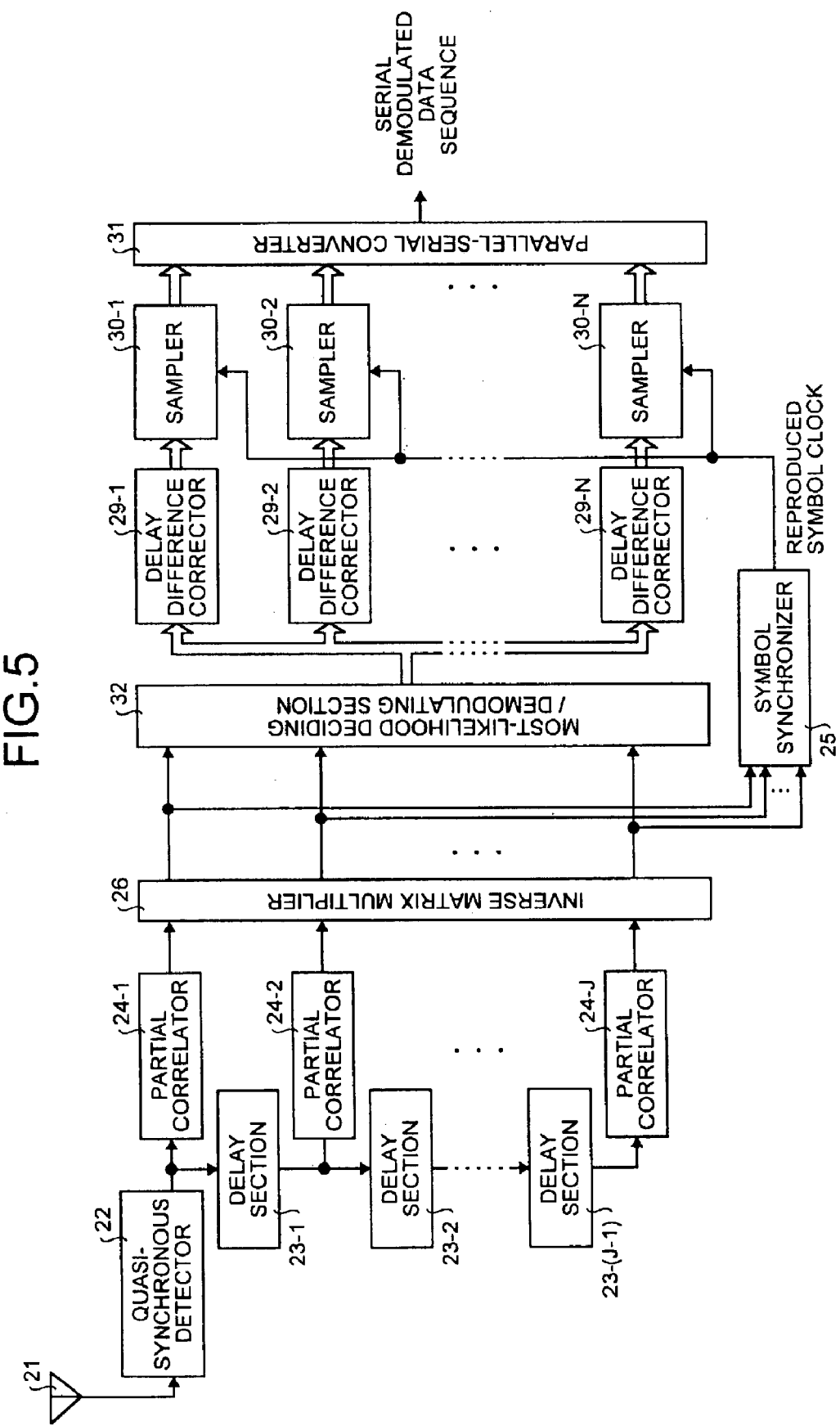
FIG. 5 is a block diagram of another spread spectrum receiver in the first embodiment.

Further, in the first embodiment, the symbol synchronizer 25 of the spread spectrum receiver generates a reproduced symbol clock depending on a partial correlation complex signal output from each of the corresponding partial correlators 24-1 to 24-J. The circuit is not thus limited, and for example, as shown in FIG. 5, an orthogonal correlation complex signal output from the inverse matrix multiplier 26 may preferably be based on for generation of a reproduced symbol clock.

A second embodiment of this invention will be explained below.

In the first embodiment, the multiplexer 8 of the spread spectrum transmitter adds N pieces of SS signals to generate a transmission multiplex SS signal, and a frequency converter 9 multiplexes the transmission multiplex SS signal by a prescribed carrier to perform a frequency conversion. However, according to the second embodiment of the invention, SS signals are each respectively shifted in phase by a prescribed corresponding amount of phase-shift, before addition thereof to generate a transmission multiplex SS signal, thereby the transmission multiplex SS signal of carrier frequency is allowed to have a moderated non-linear characteristic, with an improved demodulation capability at the spread spectrum receiver.

The second embodiment is different from the first embodiment in that each SS signal is phase-shifted before addition thereof to obtain a transmission multiplex SS signal. As the rest of the configuration is identical, generation and demodulation of the transmission multiplex SS signal will be explained below. Like elements are designated by like reference characters, without redundant explanation.

Figure 6:
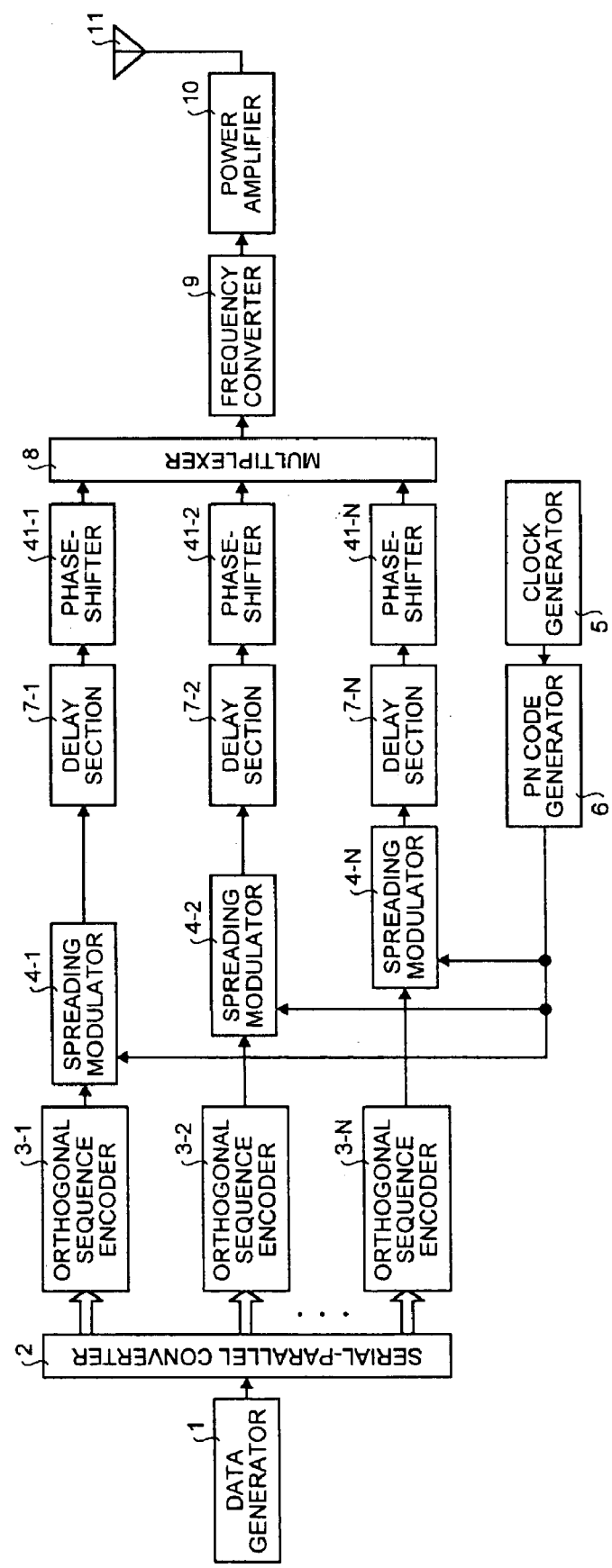
FIG. 6 is a block diagram of a spread spectrum transmitter in a second embodiment of the invention.

FIG. 6 is a block diagram showing the configuration of a spread spectrum transmitter according to the second embodiment. As shown in FIG. 6, the spread spectrum transmitter is provided with phase-shifter 41-1 to 41-N.

The operation of the spread spectrum transmitter configured as described according to the second embodiment will be explained below.

N delay sections 7-1 to 7-N provide SS signals with prescribed delays provided thereto, and the SS signals are input to the phase-shifters 41-1 to 41-N, respectively.

A phase of prescribed corresponding amount $\{\alpha_1, \alpha_2, \alpha_3, \ldots, \alpha_N\}$ in radian is set at each phase-shifter 41-1 to 41-N. The amounts of phase-shift $\alpha_1$ to $\alpha_N$ are calculated, for example, by the following equation 5, depending on a number N of SS signals to be multiplexed and a maximum $\alpha_{MAX}$ of the phase-shift amounts.

$$\acute{a}_n = \acute{a}_{MAX} \times (n-1)/N \tag{5}$$

where n is a variable for identifying a corresponding one of the phase-shifters 41-1 to 41-N, such that $n^a \{1, 2, \ldots, N\}$.

For example, letting multiplex number N=4 and maximum $\alpha_{MAX} = \pi$, it follows that phase-shift amounts $\{\alpha_1, \alpha_2, \alpha_3, \alpha_4\} = \{0, \pi/4, \pi/2, 3\pi/4\}$.

Each of the phase-shifter 41-1 to 41-N calculates a phase $\theta$ by the following equation 6, depending on an in-phase component $I_s$ and a quadrature component $Q_s$ of a corresponding delayed SS signal.

$$\acute{e} = \tan^{-1}(Q_s/I_s) \tag{6}$$

Alternately, as shown by the following equation 7-1 and equation 7-2, the phase of SS signal is phase-shifted in accordance with the phase-shift amount $\alpha_1$ to $\alpha_N$, and an in-phase component $I_d$ and a quadrature component $Q_d$ of the phase-shifted SS signal are calculated.

$$I_d = \sqrt{I_s^2 + Q_s^2} \times \cos(\acute{e} + \acute{a}) \tag{7-2}$$

$$Q_d = \sqrt{I_s^2 + Q_s^2} \times \sin(\acute{a} + \acute{a}) \tag{7-2}$$

Then, the multiplexer 8 performs an addition of the phase-shifted SS signals output from the phase-shifters 41-1 to 41-N to generate a transmission multiplex SS signal.

Figure 7:
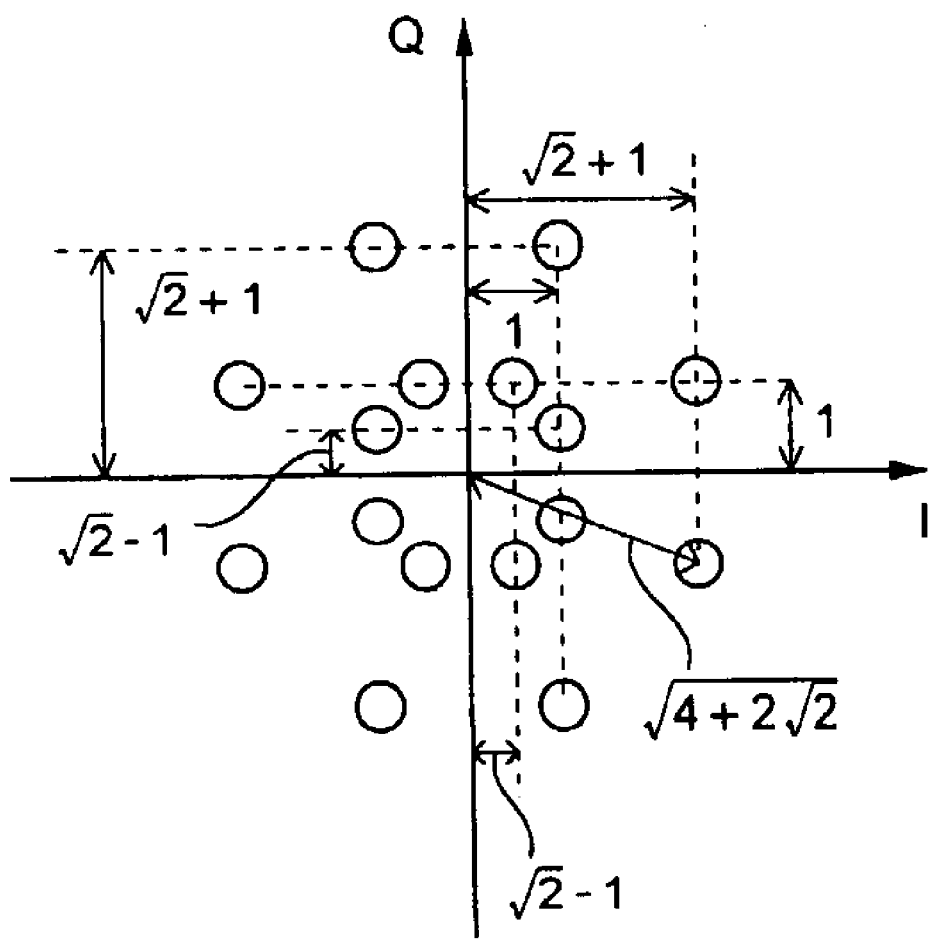
FIG. 7 shows location of signal points of a multiplex SS signal to be transmitted in the second embodiment.

FIG. 7 shows an example of location of signal points of the transmission multiplex SS signal for the case of multiplex number N=4 and phase-shift amounts $\{\alpha_1, \alpha_2, \alpha_3, \alpha_4\} = \{0, \pi/4, \pi/2, 3\pi/4\}$. In the second embodiment, the signal points are located on a plurality of concentric circles, having a maximum amplitude $A_{MAX}$ of the transmission multiplex SS signal, such that:

$$A_{MAX} = \sqrt{4 + 2\sqrt{2}} \tag{8}$$

To this point, in the first embodiment, as shown in FIG. 2B, respective signal points of the transmission multiplex SS signal are located on in-phase axis (I), having a maximum amplitude of the transmission multiplex SS signal $A_{MAX}=4$, so that the transmission multiples SS signal in the second embodiment has a smaller maximum amplitude.

The transmission multiplex SS signal is frequency-converted at the frequency converter 9, and amplified to a prescribed power value at the power amplifier 10, to be transmitted from the transmission antenna 11.

Figure 8:
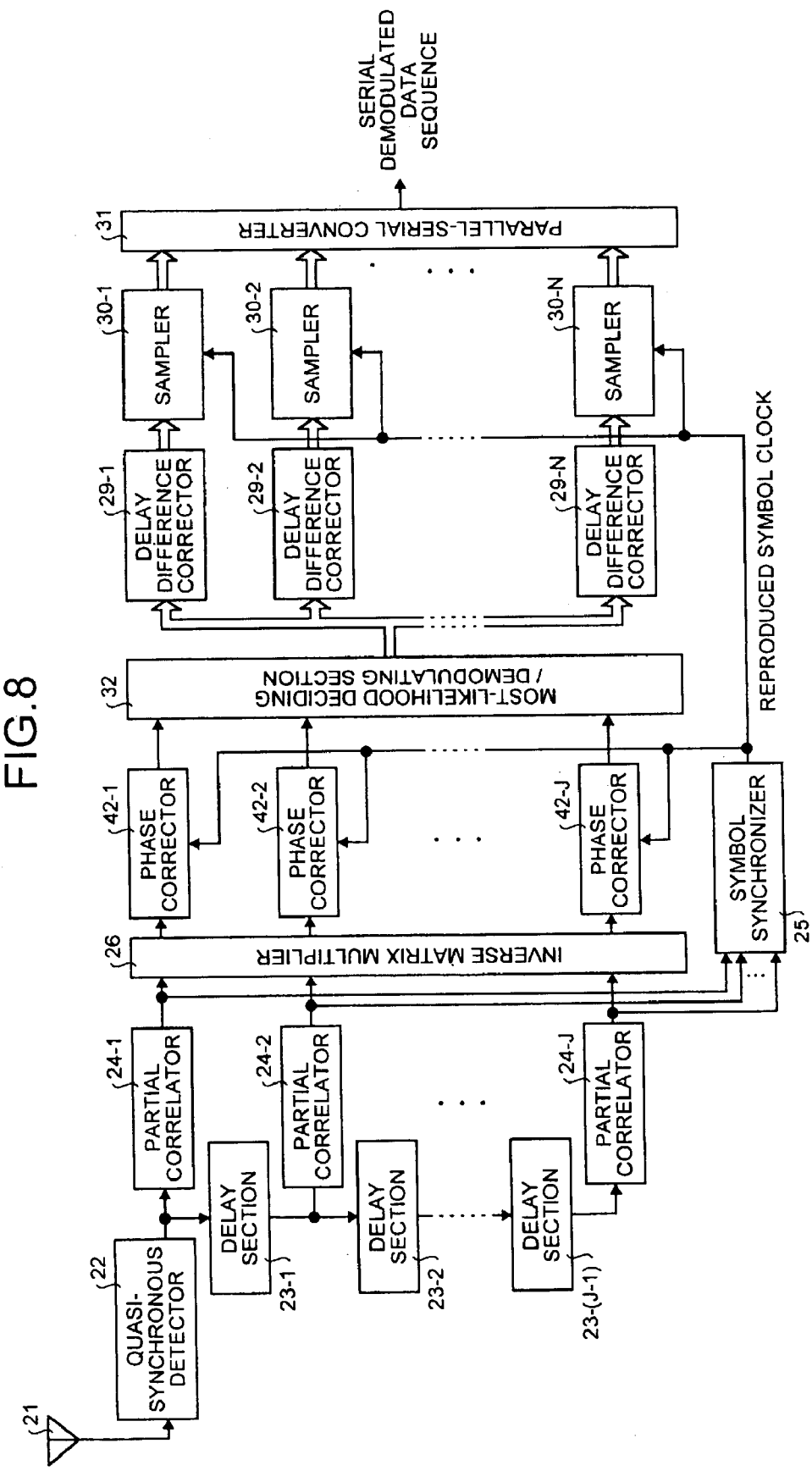
FIG. 8 is a block diagram of a spread spectrum receiver in the second embodiment.

A spread spectrum receiver of the spread spectrum communications system according to the second embodiment will be explained with reference to the diagram shown in FIG. 8. In FIG. 8, the spread spectrum receiver is provided with phase correctors 42-1 to 42-J which correct phases of orthogonal correlation complex signals $i_1$ to $i_j$ output from the inverse matrix multiplier 26.

The operation of the spread spectrum receiver configured as described according to the second embodiment will be explained below.

The orthogonal correlation complex signals $i_1$ to $i_j$, output from the inverse matrix multiplier 26 and related to the orthogonal code sequences $d_i$ to $d_j$, are each respectively input to a corresponding one of the phase correctors 42-1 to 42-J.

Each of the phase correctors 42-1 to 42-J stores the phase-shift amounts $\alpha_1$ to $\alpha_N$ of each of the phase-shifters 41-1 to 41-N in the spread spectrum transmitter and the delay times $\hat{o}_1 T_c$ to $\hat{o}_N T_c$ provided to the SS signals.

Each of the phase correctors 42-1 to 42-J is adapted to specify the reception timing of data for a corresponding one of delay-multiplexed channels, based on the timing (for example, a rising edge) for data sampling of a reproduced symbol clock and the delay times $\hat{o}_1 T_c$ to $\hat{o}_N T_c$ of the SS signals.

For example, the point of time at a delay time $\hat{o}_1 T_c$ from the symbol data sampling timing of the reproduced symbol clock may preferably be specified as the data reception timing of SS signal (with phase-shift amount $\alpha_1$ for a first channel.

Each of the phase correctors 42-1 to 42-J holds therein such phase correction amounts periodically variable at a symbol period $T_s$ that cancel the phase-shift amounts $\alpha_1$ to $\alpha_N$ of the SS signals, and identifies a phase correction amount corresponding to the channel at the data reception timing.

For example, at the data reception timing of SS signal (with phase-shift amount a,) of the first channel, a phase correction amount $-\alpha_1$ corresponding thereto is identified, and at the data reception timing of SS signal (with phase-shift amount $\alpha_N$) of an N-th channel, a phase correction amount $-\alpha_N$ corresponding thereto is identified.

The phase correctors 42-1 to 42-J is adapted for a sequential phase correction of orthogonal correlation complex signals $i_1$ to $i_J$ in accordance with their phase correction amounts, and outputs the result to the most-likelihood deciding/demodulating section 32.

The spread spectrum communications system according to the second embodiment is thus adapted, like the first embodiment, for efficient use of a PN code allotted to the spread spectrum transmitter, allowing transmission rate to be increased high in the spread spectrum communications system employing the M-ary SS system.

Moreover, the maximum amplitude $A_{MAX}$ of the transmission multiplex SS signal is suppressed small, thereby reducing the influence of signal distortion due to non-linear amplification of the transmission multiplex SS signal, with the more improved demodulation capabilities, such as a bit error rate characteristic of the spread spectrum receiver.

In the spread spectrum transmitter of the second embodiment, the phase-shifters 41-1 to 41-N input the delayed SS signals, for their phase-shift processes. However, it is not always necessary to provide such a limitation. SS signals output from the spreading modulators 4-1 to 4-N may preferably be phase-shifted at the phase-shifters 41-1 to 41-N before provision of prescribed delay amounts to the SS signals.

Moreover, in the second embodiment, the phase-shifters 41-1 to 41-N have phase-shift amounts $\alpha_1$ to $\alpha_N$ calculated by the equation 5. However, it is not always necessary to provide such a limitation to the calculation of the phase-shift amounts $\alpha_1$ to $\alpha_N$. Therefore, any phase-shift amount calculation method may be adopted so that the maximum amplitude of transmission multiplex SS signal can be suppressed small.

A third embodiment of this invention will be explained below.

In the second embodiment, the N parallel data sequences are separately processed for orthogonal code conversion and spreading modulation, and resultant sequences are delayed and multiplexed to generate a transmission multiplex SS signal, for the transmission rate to be increased. However, according to a third embodiment of the invention, parallel data sequences as once converted into orthogonal code sequences are processed for their phase-shift keying (PSK) modulation, for the transmission rate to be the further increased.

The third embodiment is different from the second embodiment in that the parallel data sequences converted into orthogonal codes sequences are each respectively processed for PSK demodulation to perform spreading modulation thereof. As the rest of the configuration is identical, the PSK modulation of orthogonal code sequence and demodulation thereof will be explained below. Like elements are designated by like reference characters, without redundant description.

Figure 9:
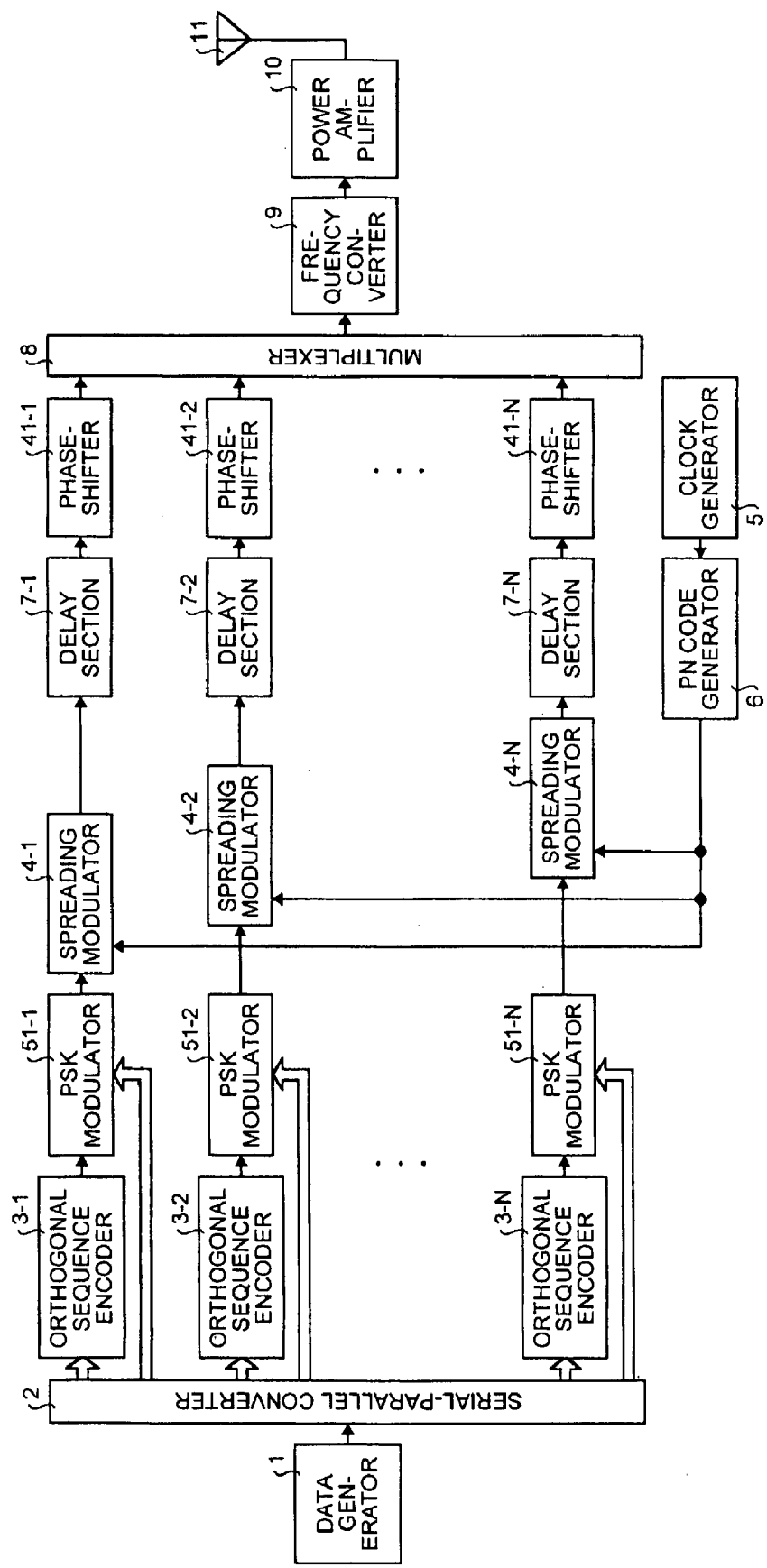
FIG. 9 is a block diagram of a spread spectrum transmitter in a third embodiment of the invention.

FIG. 9 is a block diagram showing a spread spectrum transmitter according to the third embodiment. As shown in FIG. 9, the spread spectrum transmitter is provided with PSK modulators 51-1 to 51-N each respectively for a PSK modulation of an orthogonal code sequence output from a corresponding one of the N orthogonal sequence encoders 3-1 to 3-N.

The operation of the spread spectrum transmitter configured as described according to the third embodiment will be explained below.

First, the data generator 1 outputs an information signal to be transmitted, at a bit rate of $R_b$" bits/sec.

Next, the serial-parallel converter 2 sequentially converts the information signal into parallel data sequences (with a data length of K+P bits) each respectively consisting of parallel data with a data length of K bits and parallel data with a data length of P bits. Of the parallel data sequences, the parallel data with the K-bit data length will be referred to as "K-bit data", and the parallel data with the P-bit data length will be referred to as "P-bit data".

The serial-parallel converter 2 sequentially distributes the parallel data sequences to the N orthogonal sequence encoders 3-1 to 3-N and the PSK modulators 51-1 to 51-N.

At each parallel data sequence, the data length K is an integer of such a value that $K \geq 2$, and the data length P is a natural number. Each of the data lengths K and P, as well as a multiplex number N of channels of SS signals available at the spread spectrum transmitter, is set to be adequate in consideration of a desirable transmission rate upon design of the spread spectrum communications system.

The orthogonal sequence encoders 3-1 to 3-N are each respectively adapted to input the K-bit data from a corresponding one of the distributed parallel data sequences, for conversion thereof into a corresponding orthogonal code sequence. The conversion process into orthogonal code sequence at each orthogonal sequence encoder 3-1 to 3-N is identical to that in the second embodiment.

On the other hand, the PSK modulators 51-1 to 51-N are each respectively adapted to input an orthogonal code sequence output from a corresponding one of the orthogonal sequence encoders 3-1 to 3-N, for a PSK modulation process of the orthogonal code sequence in accordance with the P-bit data of a corresponding parallel data sequence.

Each PSK modulator 51-1 to 51-N stores a set of correspondence relationships between the P-bit data and phase-shift amounts for PSK modulation of orthogonal code sequences (hereinafter each respectively referred to as "PSK modulation phase-shift amount").

For example, in a case of the PSK modulation process to be a BPSK (binary PSK) modulation process for P-bit data with a data length P=1, each PSK modulator 51-1 to 51-N stores a combination of a 0 (radian) as a PSK modulation phase-shift amount for P-bit data to be <+1> and a π (radian) as a PSK modulation phase-shift amount for P-bit data to be <−1>.

Each PSK modulator 51-1 to 51-N is configured to identify a PSK modulation phase-shift amount corresponding to the P-bit data of an input parallel data sequence, and to phase-shift the orthogonal code sequence by the PSK modulation phase-shift amount. After the PSK modulation process, the orthogonal code sequence is output to a corresponding one of the spreading modulators 4-1 to 4-N.

Figure 10:
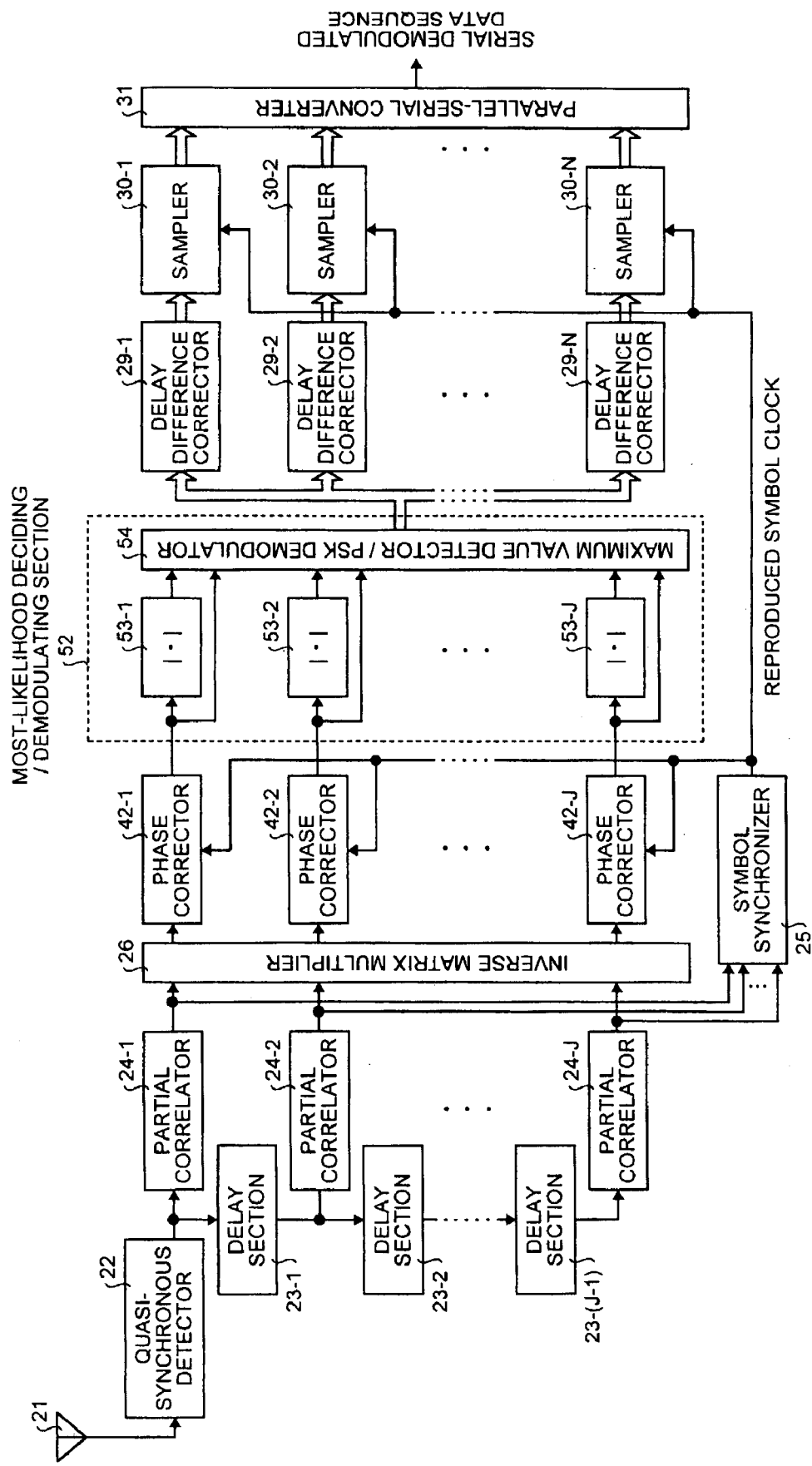
FIG. 10 is a block diagram of a spread spectrum receiver in the third embodiment.
Figure 11:
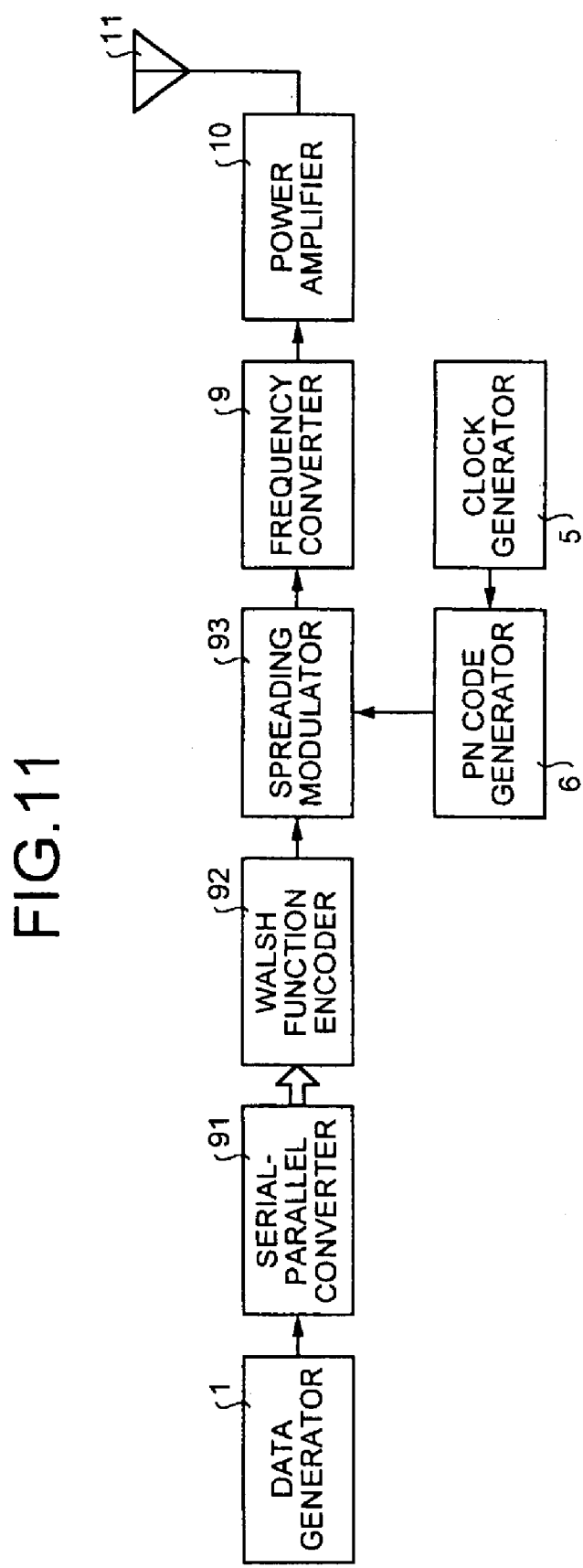
FIG. 11 is a block diagram of a transmitter employed in a conventional M-ary/SS transmission system.

A spread spectrum receiver according to the third embodiment will be explained with reference to the block diagram shown in FIG. 10. In FIG. 10, the spread spectrum receiver is provided with a most-likelihood deciding/demodulating section 52 which receives respective orthogonal correlation complex signals $i_1$ to $i_j$ after phase correction process, for their demodulation to obtain the K-bit data and the P-bit data, absolute value calculators 53-1 to 53-J each respectively for calculating an absolute value of a corresponding one of the orthogonal correlation complex signals $i_1$ to $i_j$, and a maximum value detector/PSK demodulator 54 adapted for identification of a K-bit data on the basis of the absolute value, and for PSK demodulation on the bases of the orthogonal correlation complex signals $i_1$ to $i_j$ to identify a P-bit data.

The operation of the spread spectrum receiver configured as described above according to the third embodiment will be explained below.

The orthogonal correlation complex signals $i_1$ to $i_j$ output from the inverse matrix multiplier 26 are processed, in the same manner as that of the second embodiment, for a phase correction process at the phase correctors 42-1 to 42-J, to be input to the most-likelihood deciding/demodulating section 52.

At the most-likelihood deciding/demodulating section 52, the absolute value calculators 53-1 to 53-J sequentially calculate absolute values of the orthogonal correlation complex signals $i_1$ to $i_j$ output, after phase correction, from corresponding phase correctors 42-1 to 42-J.

The maximum value detector/PSK demodulator 54 is configured to identify a maximum of absolute values of the orthogonal correlation complex signals $i_1$ to $i_j$, and identify a K-bit data corresponding to the maximum, as demodulated K-bit data.

For example, in the case of the absolute value of the orthogonal correlation complex signal $i_1$ to be a maximum of the orthogonal correlation complex signals $i_1$ to $i_j$, the data sequence $c_1$ related in advance to the orthogonal correlation complex signal $i_1$ is identified as demodulated K-bit data.

Further, the maximum value detector/PSK demodulator 54 stores a set of correspondence relationships between PSK modulation phase-shift amounts and P-bit data applied to the PSK modulator of the spread spectrum transmitter.

The maximum value detector/PSK demodulator 54 is configured to detect a phase of an orthogonal correlation complex signal of which the absolute value is maximum, and compare the phase with respective PSK modulation phase-shift amounts, to thereby identify a PSK modulation phase-shift amount to be minimum in error, for identification of P-bit data related to the PSK modulation phase-shift amount, as demodulated P-bit data.

For example, in the case of the PSK modulation phase-shift amount described, if the orthogonal correlation complex signal of which the absolute value is a maximum has a phase of 0 (radian), the demodulated P-bit data <+1> is identified to be output. If the orthogonal correlation: complex signal of which the absolute value is a maximum has a phase of $\pi$ (radian), the demodulated P-bit data <-1> is identified to be output.

The maximum value detector/PSK demodulator 54 outputs data sequences consisting of demodulated K-bit data and demodulated P-bit data, as demodulated parallel data sequences, to the N delay difference correctors 29-1 to 29-J.

In the spread spectrum communications system according to the third embodiment, K-bit data of the parallel data sequences is converted into an orthogonal code sequence, which is processed for PSK modulation based on P-bit data and thereafter for a spreading modulation to generate an SS signal, and N pieces of SS signals are delayed, multiplexed for radio transmission.

Accordingly, the transmission multiplex SS signal has a transmission rate $t_r''$ defined by the following equation 9, allowing the transmission rate to be more increased in comparison with the transmission rate (equation 4) in the second embodiment.

$$t_r'' = N \times \frac{K+P}{L} R_c \qquad (9)$$

where $R_c$ is a chip rate of PN code.

In the spread spectrum transmitter according to the third embodiment, each PSK modulator 51-1 to 51-N is adapted for a PSK modulation process to be performed on an orthogonal code sequence output from a corresponding orthogonal sequence encoder 3-1 to 3-N. It, however, is not always necessary to provide such a limitation. The following configuration may be employed. That is, the K-bit data output from the serial-parallel converter 2 is received to perform thereon a PSK modulation process based on the P-bit data, and the result of this modulation process is converted into prescribed orthogonal code sequences to be output to the spreading modulators 4-1 to 4-N.

In the third embodiment, the phase shifters 41-1 to 41-N of the spread spectrum transmitter each adapted for a prescribed phase shift process to be performed on an SS signal with a delay provided thereto, and the phase correctors 42-1 to 42-J of the spread spectrum receiver, each adapted for a phase correction process to be performed on a corresponding one of orthogonal correlation complex signals $i_1$ to $i_j$ output from the inverse matrix multiplier 26, to output the result to the most-likelihood deciding/demodulating section 52. It, however, is not always necessary to provide such a limitation. Even in configuration in which no phase shift process is performed at the phase shifters 41-1 to 41-N and the phase correctors 42-1 to 42-N, it is possible as a matter of course to obtain such an effect of the third embodiment that the transmission rate is increased.

Moreover, the third embodiment is described for the case (P=1) of the BPSK modulation process of an orthogonal code sequence at each of PSK modulators 51-1 to 51-N. However, it is not always necessary to limit the modulation system at the PSK modulators 51-1 to 51-N to the BPSK. The QPSK (quadrature PSK, P=2), or any other PSK modulation system (P≧2) may be used.

In the case of the PSK modulation to be QPSK for P-bit data of data length P=2, each PSK modulator 51-1 to 51-N as well as the maximum value detector/PSK demodulator 54 stores therein, for example, a PSK modulation phase-shift amount of $\pi/4$ for a P-bit data <+1, +1>, $3\pi/4$ for a P-bit data <+1, -1>, $5\pi/4$ for a P-bit data <-1, +1>, or $7\pi/4$ for a P-bit data <-1, -1>, for definition of correspondence between P-bit data and PSK modulation phase-shift amount.

As will be seen from the foregoing description, according to one aspect of the invention, the spread spectrum transmitter of the M-ary/SS system is configured to provide delays having different magnitudes to SS signals for a plurality of channels, to multiplex the SS signals, thereby generating a transmission multiplex SS signal to be transmitted. Thus, it is advantageously possible to obtain the spread spectrum communications system with a higher transmission rate than the conventional spread spectrum communications system of the M-ary/SS system.

The prescribed spreading codes allotted to the spread spectrum transmitters are used for the spreading demodulation process of a respective channel. Thus, it is advantageously possible to suppress the increase in the number of use of the spreading codes even when the SS signals for the:

channels are multiplexed and transmitted, and to prevent running out of the spreading codes for the entire radio communications system.

Moreover, the spread spectrum transmitter is configured to subject the SS signals respectively to phase shift process by prescribed phase-shift amounts to generate a transmission multiplex SS signal. Thus, it is advantageously possible to suppress variation in amplitude of the transmission multiplex SS signal while aiming at increasing the transmission rate, to obtain the spread spectrum communications system whose demodulation capability is less deteriorated even when the transmission multiplex SS signal is subjected to non-linear signal conversion.

Furthermore, the spread spectrum transmitter is configured to determine the number of bits of the parallel data sequence to be transmitted by a respective channel as K+P bits, convert the K-bit data into a prescribed orthogonal code sequence, and perform phase-shift process of the converted data by a prescribed phase-shift amount for PSK modulation based on P-bit data. Thus, it is advantageously possible to have the further increased transmission rate.

Moreover, the spread spectrum transmitter is configured to employ the Walsh sequence as orthogonal code sequence to perform an orthogonal sequence encoding process. Thus, it is advantageously possible to obtain the spread spectrum communications system with the spread spectrum transmitter reduced in scale of circuitry.

According to another aspect of the invention, the spread spectrum receiver of the M-ary/SS system is configured to calculate partial correlation values between the transmission multiplex SS signal as received and the spreading codes by which the SS signals are multiplied, and multiply the partial correlation values by a prescribed matrix prepared on the basis of orthogonal code sequences, to thereby calculate a plurality of orthogonal correlation values related to the orthogonal correlation sequences. The receiver is also configured to identify a parallel data sequence for a respective channel related in advance to an orthogonal code sequence in which the orthogonal correlation value is maximum, correct the delay difference of the respective parallel data sequences, and then perform their sampling and parallel-serial conversion to obtain a serial demodulated data sequence. Thus, it is advantageously possible to obtain the spread spectrum communications system with a higher transmission rate than the conventional spread spectrum communications system of the M-ary/SS system.

Furthermore, the spread spectrum receiver is configured to receive the transmission multiplex SS signal subjected to a phase-shift process by a prescribed amount for each SS signal, and calculate a phase-shift correction amount to cancel the phase-shift amount of each SS signal, to correct the phase of the corresponding orthogonal correlation value on the basis of the phase-shift correction amount. Thus, it is advantageously possible to suppress variation in amplitude of the transmission multiplex SS signal while aiming at increasing the transmission rate, to obtain the spread spectrum communications system whose demodulation capability is less deteriorated even when the transmission multiplex SS signal is subjected to non-linear signal conversion.

Moreover, the spread spectrum receiver is configured to identify demodulated K-bit data on the basis of a respective orthogonal correlation value, and perform a PSK demodulation process of the orthogonal correlation value to identify demodulated P-bit data, thereby generating a demodulated parallel data sequence consisting of the demodulated K-bit data and the demodulated P-bit data. Thus, it is advantageously possible to have the more increased transmission rate.

Furthermore, the spread spectrum receiver is configured to employ Walsh sequence as orthogonal code sequence to perform a calculation process of a orthogonal correlation value. Thus, it is advantageously possible to reduce the scale of circuitry of the spread spectrum receiver.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A spread spectrum transmitter comprising:
   a serial-parallel converting unit that inputs an information signal, sequentially converts the information signal into parallel data sequences of a prescribed data length, and sequentially distributes the parallel data sequences to N channels, where N is 2 or greater natural number;
   an orthogonal sequence encoding unit that sequentially converts the parallel data sequences into prescribed orthogonal code sequences;
   a spreading modulating unit that performs a spectrum spreading modulation process by respectively multiplying the orthogonal code sequences by prescribed spreading codes to output N spread spectrum signals;
   a delay unit that provides delays having different magnitudes to the N spread spectrum signals;
   a multiplexing unit that multiplexes the N spread spectrum signals in a prescribed manner to generate a transmission multiplex spread spectrum signal; and
   a transmitting unit that performs prescribed signal processing for transmitting the transmission multiplex spread spectrum signal.

2. The spread spectrum transmitter according to claim 1, further comprising a phase-shifting unit that phase-shifts the spread spectrum signals by respective prescribed phase-shift amounts.

3. The spread spectrum transmitter according to claim 1, wherein
   the serial-parallel converting unit determines a data length of the parallel data sequences as K+P bits, where K and P are natural numbers, and
   the orthogonal sequence encoding unit is configured to sequentially convert K-bit data of the parallel data sequences into prescribed orthogonal code sequences,
   the spread spectrum transmitter further comprising a phase-shift keying (PSK) modulating unit that phase-shifts the orthogonal code sequences by prescribed phase-shift amounts for PSK modulation determined depending on P-bit data of the parallel data sequences.

4. The spread spectrum transmitter according to claim 1, wherein
   the serial-parallel converting unit determines a data length of the parallel data sequences as K+P bits, where K and P are natural numbers,
   the spread spectrum transmitter further comprising a phase-shift keying (PSK) modulating unit that phase-shifts K-bit data of the parallel data sequences by prescribed phase-shift amounts for PSK modulation determined depending on P-bit data of the parallel data sequences, wherein
   the orthogonal sequence encoding unit is configured to sequentially convert the K-bit data after the PSK modulation into prescribed orthogonal code sequences.

5. The spread spectrum transmitter according to claim 1, wherein the orthogonal sequence encoding unit is configured to employ Walsh sequences as the orthogonal code sequences.

6. A spread spectrum receiver comprising:

a partial correlation calculating unit that holds partial spreading codes obtained by dividing spreading codes employed in a spread spectrum transmitter by a bit number J of orthogonal code sequences, and calculates partial correlation values between a transmission multiplex spread spectrum signal transmitted from the spread spectrum transmitter and the partial spreading codes, the spread spectrum transmitter including a serial-parallel converting unit that inputs an information signal, sequentially converts the information signal into parallel data sequences of a prescribed data length, and sequentially distributes the parallel data sequences to N channels, where N is 2 or greater natural number, an orthogonal sequence encoding unit that sequentially converts the parallel data sequences into prescribed orthogonal code sequences, a spreading modulating unit that performs a spectrum spreading modulation process by respectively multiplying the orthogonal code sequences by prescribed spreading codes to output N spread spectrum signals, a delay unit that provides delays having different magnitudes to the N spread spectrum signals, a multiplexing unit that multiplexes the N spread spectrum signals in a prescribed manner to generate a transmission multiplex spread spectrum signal, and a transmitting unit that performs prescribed signal processing for transmitting the transmission multiplex spread spectrum signal;

an inverse matrix multiplying unit that holds an inverse matrix of an orthogonal code matrix having the orthogonal code sequences employed in the spread spectrum transmitter as row elements of the orthogonal code sequences, and multiplies the inverse matrix by a column vector consisting of the partial correlation values to calculate orthogonal correlation values respectively corresponding to the orthogonal code sequences;

a most-likelihood deciding/demodulating unit that identifies an orthogonal code sequence having an orthogonal correlation value as a maximum, to output a parallel data sequence related in advance to the orthogonal code sequence, as a demodulated parallel data sequence, to a respective one of N channels;

a delay difference correcting unit that corrects delay differences of the demodulated parallel data sequences of the channels depending on delay amounts provided to the spread spectrum signals in the channels of the spread spectrum transmitter; and a demodulation data converting unit that samples the demodulated parallel data sequences after delay difference correction depending on a reproduced symbol clock synchronized to a cyclic period of spreading code of the transmission multiplex spread spectrum signal, and parallel-serial converts the sampled data of the channels to obtain a serial demodulated data sequence.

7. The spread spectrum receiver according to claim 6, further comprising:

a phase correcting unit that identifies a data reception timing for a respective channel delay-multiplexed depending on a prescribed data extraction timing of the reproduced symbol clock and a delay amount provided to the spread spectrum signal of the channel, calculates a phase correction amount to cancel a phase-shift amount of the spread spectrum signal of the respective channel that is phase-shifted in the spread spectrum transmitter, the spread spectrum transmitter further including a phase-shifting unit that phase-shifts the spread spectrum signals by respective prescribed phase-shift amounts, and respectively corrects phases of the orthogonal correlation values, depending on a phase correction amount corresponding to each of the channels, at the data reception timing of the channel.

8. The spread spectrum receiver according to claim 6 for receiving the transmission multiplex spread spectrum signal transmitted from the spread spectrum transmitter, the spread spectrum transmitter being configured such that the serial-parallel converting unit determines a data length of the parallel data sequences as K+P bits, where K and P are natural numbers, and the orthogonal sequence encoding unit sequentially converts K-bit data of the parallel data sequences into prescribed orthogonal code sequences, the spread spectrum transmitter further includes a phase-shift keying (PSK) modulating unit that phase-shifts the orthogonal code sequences by prescribed phase-shift amounts for PSK modulation determined depending on P-bit data of the parallel data sequences, wherein the most-likelihood deciding/demodulating unit includes an absolute value calculating unit that respectively calculates absolute values of the orthogonal correlation values, and a maximum value deciding/PSK demodulating unit that identifies an orthogonal correlation value having an absolute value as a maximum, identifies K-bit data related in advance to the orthogonal correlation value in the spread spectrum transmitter, as demodulated K-bit data, PSK-demodulates a phase of the identified orthogonal correlation value, and obtains demodulated P-bit data to generate demodulated parallel data sequences each consisting of the demodulated K-bit data and the demodulated P-bit data.

9. The spread spectrum receiver according to claim 6 for receiving the transmission multiplex spread spectrum signal transmitted from the spread spectrum transmitter, the spread spectrum transmitter wherein the serial-parallel converting unit determines a data length of the parallel data sequences as K +P bits, where K and P are natural numbers, the spread spectrum transmitter further including a phase-shift keying (PSK) modulating unit that phase-shifts K-bit data of the parallel data sequences by prescribed phase-shift amounts for PSK modulation determined depending on P-bit data of the parallel data sequences, wherein the orthogonal sequence encoding unit is configured to sequentially convert the K-bit data after the PSK modulation into prescribed orthogonal code sequences, wherein the most-likelihood deciding/demodulating unit includes an absolute value calculating unit that respectively calculates absolute values of the orthogonal correlation values, and a maximum value deciding/PSK demodulating unit that identifies an orthogonal correlation value having an absolute value as a maximum, identifies K-bit data related in advance to the orthogonal correlation value in the spread spectrum transmitter, as demodulated K-bit data, PSK-demodulates a phase of the identified orthogonal correlation value, and obtains demodulated P-bit data to generate demodulated parallel data sequences each consisting of the demodulated K-bit data and the demodulated P-bit data.

10. The spread spectrum receiver according to claim 6, wherein the inverse matrix multiplying unit is configured to hold an inverse matrix of an orthogonal code matrix having orthogonal code sequences of Walsh sequences as row elements of the orthogonal code sequences.

* * * * *